(12) United States Patent
Rodriguez et al.

(10) Patent No.: US 11,042,125 B2
(45) Date of Patent: Jun. 22, 2021

(54) DECORATIVE ITEM MADE OF A HEAVY COMPOSITE MATERIAL

(71) Applicant: The Swatch Group Research and Development Ltd, Marin (CH)

(72) Inventors: Pablo Rodriguez, Marin-Epagnier (CH); Juliette Muller, La Neuveville (CH); Nicolas Francois, Neuchatel (CH); Julien Huser, Pery (CH); Julien Dahan, Porrentruy (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/674,245

(22) Filed: Nov. 5, 2019

(65) Prior Publication Data

US 2020/0201260 A1   Jun. 25, 2020

(30) Foreign Application Priority Data

Dec. 24, 2018   (EP) .................................... 18215840

(51) Int. Cl.
*G04B 37/22* (2006.01)
*A44C 27/00* (2006.01)
(Continued)

(52) U.S. Cl.
CPC ............... *G04B 37/22* (2013.01); *A44C 5/10* (2013.01); *A44C 27/003* (2013.01);
(Continued)

(58) Field of Classification Search
CPC ........ A44C 5/10; A44C 27/003; G04B 37/22; G04B 37/225; G04B 19/12; G04B 19/283; G04B 19/042
(Continued)

(56) References Cited

U.S. PATENT DOCUMENTS 3,942,317 A   3/1976  Schluep
5,578,383 A   11/1996 Beyer et al.
(Continued)

FOREIGN PATENT DOCUMENTS

CH   707 298 B1   6/2014
EP   2 592 498 A1   5/2013
(Continued)

OTHER PUBLICATIONS

Emblem, "Plastic properties for packaging materials", 2012, London College of Fashion, URL: <https://www.sciencedirect.com/science/article/pii/B9781845696658500135>, pp. 287-309 (Year: 2012).*
(Continued)

*Primary Examiner* — Humera N. Sheikh
*Assistant Examiner* — Katherine A Christy
(74) *Attorney, Agent, or Firm* — Sughrue Mion, PLLC

(57) ABSTRACT

A decorative item made from a moulded material having a density of between 2 and 7 g/cm³, wherein the moulded material includes by weight: 60 to 90% of a metallic or ceramic material having a density higher than or equal to 5 g/cm³, 10 to 32% of a plastic material including a thermoplastic resin and a coupling agent, 0 to 8% of a reinforcement, 0 to 3% of a pigment. Also, a method of manufacturing this decorative item by injection moulding.

26 Claims, 1 Drawing Sheet

(51) Int. Cl.
*B29C 45/00* (2006.01)
*G04B 19/04* (2006.01)
*G04B 19/12* (2006.01)
*G04B 19/28* (2006.01)
*B29K 101/12* (2006.01)
*B29K 505/00* (2006.01)
*B29K 509/02* (2006.01)
*B29L 31/00* (2006.01)
*A44C 5/10* (2006.01)

(52) U.S. Cl.
CPC ........ *B29C 45/0013* (2013.01); *G04B 19/042* (2013.01); *G04B 19/12* (2013.01); *G04B 19/283* (2013.01); *G04B 37/225* (2013.01); *B29K 2101/12* (2013.01); *B29K 2505/00* (2013.01); *B29K 2509/02* (2013.01); *B29L 2031/739* (2013.01)

(58) Field of Classification Search
USPC ........................................................ 428/545
See application file for complete search history.

(56) References Cited

U.S. PATENT DOCUMENTS

| | | | |
|---|---|---|---|
| 2006/0055077 A1* | 3/2006 | Heikkila | A01K 95/005 264/173.16 |
| 2009/0254171 A1* | 10/2009 | Heikkila | F42B 7/046 623/1.15 |
| 2010/0175305 A1* | 7/2010 | Heikkila | A01K 85/16 43/42.39 |
| 2011/0236699 A1* | 9/2011 | Heikkila | C08K 5/0091 428/457 |
| 2012/0028047 A1* | 2/2012 | Imai | B29C 48/625 428/403 |
| 2013/0114381 A1 | 5/2013 | Kaelin et al. | |
| 2015/0124573 A1* | 5/2015 | Knuchel | G04B 37/22 368/280 |

FOREIGN PATENT DOCUMENTS

| | | |
|---|---|---|
| JP | 52-146272 A | 12/1977 |
| JP | 60-245668 A | 12/1985 |
| JP | 61-091254 A | 5/1986 |
| JP | 62-187735 A | 8/1987 |
| JP | 1-234216 A | 9/1989 |
| JP | 7-191156 A | 7/1995 |
| JP | 7-278603 A | 10/1995 |
| JP | 2003-139869 A | 5/2003 |

OTHER PUBLICATIONS

European Search Report for EP 18 21 5840 dated Jun. 26, 2019.
Communication dated Feb. 9, 2021 by the Japanese Patent Office in application No. 2019-220929.

* cited by examiner

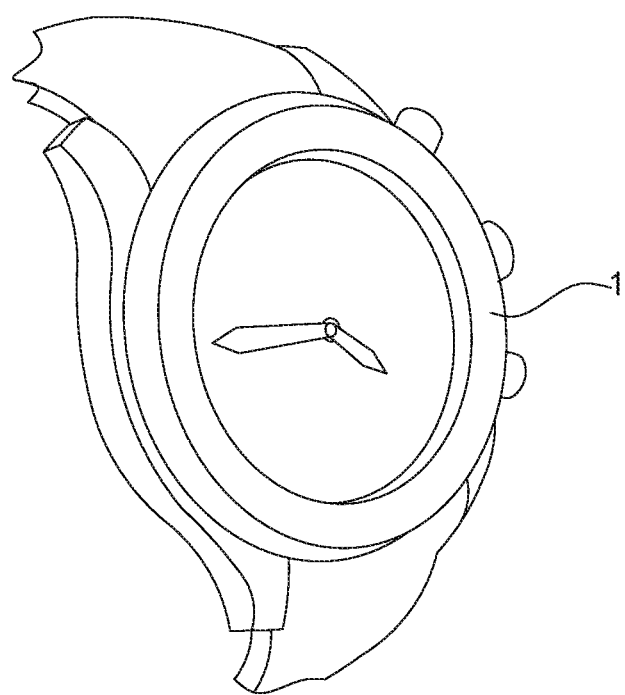

DECORATIVE ITEM MADE OF A HEAVY COMPOSITE MATERIAL

CROSS REFERENCE TO RELATED APPLICATION

This application claims priority from European Patent Application No. 18215840.2 filed Dec. 24, 2018, the contents of all of which are incorporated herein in its entirety.

FIELD OF THE INVENTION

The present invention relates to a decorative item or article and in particular to an external component for horology made of a heavy, shock resistant composite material. It also relates to the method for manufacturing the item.

PRIOR ART

Numerous external components, such as case middles and bracelets are made of plastic materials. These components can be made by moulding processes, which have the advantage of enabling various shapes to be obtained without any finishing operations. These plastic components have the characteristic of having a density close to 1 and therefore of being light. This may constitute a drawback for the user who wishes to wear a watch having a certain weight on the wrist.

To overcome this drawback, it was proposed, for example in EP Patent No. 2482142, to make timepiece components, whether for the timepiece movement or exterior, from plastic materials reinforced with a high density metallic powder such as a tungsten powder. These components are made by an injection moulding process, which maintains the advantage of shaping in the mould without any subsequent finishing while also increasing density.

SUMMARY OF THE INVENTION

It is an object of the present invention to propose a novel heavy composite material composition that meets the aesthetic and mechanical, and in particular resistance criteria, of horological applications.

To this end, the present invention proposes a decorative item made of a material containing by weight:
60 to 90% of a metallic or ceramic material having a density higher than or equal to 5 g/cm$^3$,
10 to 32% of a plastic material including a thermoplastic resin or a mixture of thermoplastic resins and a coupling agent,
0 to 8% of a reinforcement,
0 to 3% of a pigment.

Preferably, the material includes a stainless steel as the metallic material, a MABS (methyl methacrylate acrylonitrile butadiene styrene) as the thermoplastic resin, and an ethylene methacrylic acid as the coupling agent.

Advantageously, the material includes a reinforcement in a weight percentage greater than or equal to 1% in order to increase the tenacity of the material and/or to limit the shrinkage of material during the moulding process. This reinforcement can be present in various forms, for example, in the form of fibres or particles.

Further, the material may contain an organic pigment such as carbon black.

The composite material thus developed has a density comprised between 2 and 7 g/cm$^3$ and high tenacity.

Further, the present invention relates to the method for making this material, which is optimised to ensure a homogeneous mixture and good compatibility between the various components of the material.

Other features and advantages of the present invention will appear in the following description of a preferred embodiment, given by way of non-limiting example, with reference to the annexed drawing.

BRIEF DESCRIPTION OF THE FIGURES

FIG. 1 represents a timepiece comprising a case middle made from the heavy composite material according to the invention.

DETAILED DESCRIPTION

The present invention relates to a decorative item made from a composite material including a plastic material and a metallic or ceramic material. The decorative item may be a constituent element of watches, jewellery, bracelets, etc. In the field of horology, this item can be an external component, such as a case middle, a case back, a bezel, a pusher, a bracelet link, a hand, a dial index, etc. By way of illustration, a case middle 1 made from the composite material according to the invention is represented in FIG. 1.

The decorative item is made by injection moulding. The manufacturing method includes the steps consisting in:
a) Preparing granules of several millimetres containing by weight:
60 to 90% of a metallic or ceramic material having a density higher than or equal to 5 g/cm$^3$,
9 to 25% of a thermoplastic resin or of a mixture of thermoplastic resins,
1 to 7% of a coupling agent,
0 to 8% of a reinforcement, preferably between 1 and 6%,
0 to 3% of a pigment,
b) Injection moulding said granules to form the decorative item. The injection moulding process is performed in a mould which has a temperature of around 90-100° C., while during the injection process the material has a temperature comprised between 200 and 300° C. and preferably between 220 and 280° C.

In step a), the granules can be produced by slicing an extruded roll of the aforementioned raw materials. Advantageously, the metallic or ceramic material and the coupling agent, both in powder form, are first introduced into a hopper of the extruder in order to coat the metallic or ceramic powder with the coupling agent prior to introducing the thermoplastic resin and the reinforcement. Thus, in a second phase, the thermoplastic resin and the reinforcement are introduced, for example laterally, into another hopper of the extruder. The pigment can be introduced during the extrusion process and advantageously in the second phase. It could also be mixed with the granules just before injection.

The metallic powder may, for example, be a conventional carbon steel powder, stainless steel powder, copper powder, copper alloy powder, or a tungsten powder. A precious metal powder or a precious metal alloy powder—typically gold, silver or platinum—can also be envisaged. Preferably, it is a nickel free stainless steel powder. The steel powder is preferably present in a weight percentage of between 60 and 80%. The tungsten powder is preferably present in a weight percentage of between 65 and 90%. It may also be a ceramic powder such as a $ZrO_2$, $CeO_2$, ZnO powder etc. Certain ceramic powders may have the advantage of being white, which, in comparison to metallic powders, facilitates pigment dyeing. Advantageously, the metallic or ceramic powder is present in a weight percentage of between 71 and 80%.

The powder has a grain size such that d90 is less than or equal to 100 µm, preferably less than or equal to 30 µm, and more preferably to 16 µm.

The thermoplastic resin may be a polyamide, an acrylic, a polyolefin, a polyester, a polycarbonate, an acrylonitrile butadiene styrene, a methyl methacrylate butadiene styrene, a polylactic acid, a phenylene polysulphide, a polyetheretherketone, a polymethyl methacrylate, a polyoxymethylene, terephthalate (PBT), and thermoplastic elastomer resins etc., or a mixture of thereof. Preferably it is a methyl methacrylate acrylonitrile butadiene styrene (MABS) which is a type of transparent ABS. Preferably, the thermoplastic resin is introduced in powder form to facilitate the mixing process during preparation of the granules. In the case of commercially available MABS in the form of granules several millimetres in diameter, a step prior to step a) consists in micronizing the granules to obtain a powder with a d90 of less than or equal to 500 µm and preferably to 315 µm.

The coupling agent is necessary to ensure proper adhesion between the metallic or ceramic powder and the thermoplastic resin. Advantageously, it is an ethylene-methacrylic acid copolymer with a weight percentage of between 5 and 20% of methacrylic acid in the copolymer. Advantageously, this copolymer is used in combination with the MABS as the thermoplastic resin. This coupling agent can be introduced in powder form with a d90 of less than or equal to 500 µm and preferably to 315 µm.

This reinforcement can be present in various forms, for example, in the form of fibres or particles. For example, it could be glass fibres, glass beads, carbon fibres and/or aramid fibres with a fibre length less than or equal to 300 µm and preferably less than or equal to 200 µm. Its objective is to improve the tenacity of the material and/or to limit shrinkage of the material during the injection moulding process.

The pigment is preferably an organic pigment having a greater power to dye the metallic or ceramic powder than inorganic pigments. For example, it could be carbon black for black, diketopyrrolopyrrole for red (e.g. Irgazin Red K3840LW by BASF), copper phthalocyanine for blue (e.g. Heliogen Blue K7096 by BASF), a monoazo pigment for yellow (e.g. Paliotol Yellow K1760 by BASF), etc. According to a variant, the pigment may be fluorescent and/or phosphorescent.

The item thus obtained includes a metallic or ceramic material and a plastic (or synthetic) material containing the thermoplastic resin, the coupling agent and any product produced by the reaction between the resin and the coupling agent during the extrusion or injection moulding process. It also includes the reinforcement and the pigment, when the latter are present.

By way of example, tests were carried out to produce case middles by injection moulding using cylindrical granules having a diameter and a length respectively on the order of 3 mm. The granules include a homogeneous mixture by weight of 72% of Carpenter Ni-free stainless steel powder (Fe17Cr11Mn3Mo) having a d90<16 µm, 18.5% of micronized MABS (Terlux 2802) with a d90<315 µm, 3.5% of ethylene methacrylic acid with 15% acid (Coathylene RP 9065-34), 6% of 200 µm long glass fibres, (Glasfaser-Flocken by Suter-Kunststoffe AG). Another mixture having the same percentages of MABS and of coupling agent but with 71% of stainless steel and 1% of carbon black (Printex 55 black) was prepared.

The aesthetic finish of the case middles is good with a grey colour for the composition without pigment and a black colour for the composition with pigment. The case middles thus obtained have a density of 3.05 g/cm$^3$ for the grey version and 3 g/cm$^3$ for the black version. Charpy pendulum impact tests followed by water resistance tests on case middles integrated in cases also demonstrated the high tenacity of the case middles made from the aforementioned composition,

The invention claimed is:

1. A decorative item made from a moulded material having a density of between 2 and 7 g/cm$^3$, wherein the moulded material comprises by weight:
   60 to 90% of a metallic or ceramic material having a density higher than or equal to 5 g/cm$^3$,
   10 to 32% of a total of (a) a plastic material including a thermoplastic resin or a mixture of thermoplastic resins, and (b) a coupling agent,
   0 to 8% of a reinforcement,
   0 to 3% of a pigment,
   characterized in that the thermoplastic resin is selected from the group consisting of a polyamide, an acrylic, a polyolefin, a polyester, a polycarbonate, an acrylonitrile butadiene styrene, a methyl methacrylate butadiene styrene, a polylactic acid, a phenylene polysulphide, a polyetheretherketone, a methyl polymethacrylate and a polyoxymethylene, and a polyurethane, and
   characterized in that the metallic or ceramic material has a d90 of less than or equal to 30 µm.

2. The decorative item according to claim 1, characterized in that the metallic material is a conventional carbon steel, a stainless steel, tungsten, copper or a copper alloy.

3. The decorative item according to claim 1, characterized in that the metallic material is a stainless steel present in the moulded material in a weight percentage of between 60 and 80%.

4. The decorative item according to claim 1, characterized in that the metallic material is tungsten present in the moulded material in a weight percentage of between 65 and 90%.

5. The decorative item according to claim 1, characterized in that the ceramic material is a zinc oxide, a zirconium oxide or a cerium oxide.

6. The decorative item according to claim 1, characterized in that the metallic material is a precious metal or a precious metal alloy.

7. The decorative item according to claim 1, characterized in that the metallic or ceramic material is present in a weight percentage of between 71 and 80%.

8. The decorative item according to claim 1, characterized in that the thermoplastic resin is methyl methacrylate acrylonitrile butadiene styrene.

9. The decorative item according to claim 1, characterized in that the thermoplastic resin is present in a weight percentage relative to the moulded material of between 15 and 20%.

10. The decorative item according to claim 1, characterized in that the coupling agent is an ethylene-methacrylic acid copolymer.

11. The decorative item according to claim 10, characterized in that the methacrylic acid is present in a weight percentage of between 5 and 20% in the copolymer.

12. The decorative item according to claim 1, characterized in that the reinforcement is formed of glass fibres, glass beads, carbon fibres and/or aramid fibres.

13. The decorative item according to claim 1, characterized in that the reinforcement is present in a weight percentage of between 1 and 6%.

14. The decorative item according to claim 1, characterized in that the pigment is organic.

15. The decorative item according to claim 14, characterized in that the pigment is fluorescent and/or phosphorescent.

16. The decorative item according to claim 1, characterized in that the item is an external timepiece component chosen from the list including a case middle, a case back, a bezel, a pusher, a bracelet link, a hand and a dial index.

17. A method for manufacturing a decorative item according to claim 1, the method including the successive steps consisting in:
   a) Preparing granules containing:
      60 to 90% of the metallic or ceramic material having the density higher than or equal to 5 g/cm³,
      9 to 25% of the thermoplastic resin,
      1 to 7% of the coupling agent,
      0 to 8% of the reinforcement,
      0 to 3% of pigment,
   b) Injection moulding said granules to form the decorative item.

18. The method according to claim 17, characterized in that the thermoplastic resin is a methyl methacrylate acrylonitrile butadiene styrene.

19. The method according to claim 18, characterized in that the methyl methacrylate acrylonitrile butadiene styrene is in powder form with a d90 of less than or equal to 500 μm.

20. The method according to claim 18, characterized in that the weight percentage of methacrylate acrylonitrile butadiene styrene is comprised between 15 and 25 wt %.

21. The method according claim 17, characterized in that the coupling agent is an ethylene-methacrylic acid copolymer in powder form with a d90 of less than or equal to 500 μm.

22. The method according to claim 17, characterized in that the metallic or ceramic powder has the d90 of less than or equal to 16 μm.

23. The method according to claim 17, characterized in that the reinforcement is in the form of fibres having a length of less than or equal to 300 μm.

24. The method according to claim 17, characterized in that step a) performed by extrusion consists in introducing, firstly, the metallic or ceramic material and a coupling agent powder into an extruder hopper and, secondly, the thermoplastic resin and the reinforcement into another lateral hopper of the extruder in order to coat the metallic or ceramic material with the coupling agent before introducing the thermoplastic resin and the reinforcement.

25. The method according to claim 24, characterized in that the pigment is introduced into the other lateral hopper or during the injection moulding process.

26. The decorative item according to claim 1, characterized in that the metallic or ceramic material includes a carbon steel or a stainless steel, and has a d90 of less than or equal to 16 μm.

* * * * *